US007277846B2

(12) United States Patent
Satoh

(10) Patent No.: US 7,277,846 B2
(45) Date of Patent: Oct. 2, 2007

(54) NAVIGATION SYSTEM

(75) Inventor: Kouichi Satoh, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 401 days.

(21) Appl. No.: 09/832,645

(22) Filed: Apr. 11, 2001

(65) Prior Publication Data

US 2001/0037203 A1    Nov. 1, 2001

(30) Foreign Application Priority Data

Apr. 14, 2000    (JP) ............................. 2000-114244

(51) Int. Cl.
*G06F 17/28* (2006.01)
*G01C 21/00* (2006.01)

(52) U.S. Cl. .................. 704/3; 704/2; 704/9; 704/275; 701/211

(58) Field of Classification Search ................ 704/232, 704/270, 271, 209, 2–9, 275, 251; 382/190, 382/279; 701/211; 340/988, 995.1
See application file for complete search history.

(56) References Cited

U.S. PATENT DOCUMENTS

| | | | | |
|---|---|---|---|---|
| 5,548,507 | A | * | 8/1996 | Martino et al. ................. 704/1 |
| 5,808,566 | A | * | 9/1998 | Behr et al. ................... 701/211 |
| 5,835,854 | A | * | 11/1998 | Palisson et al. ................ 704/8 |
| 5,844,505 | A | * | 12/1998 | Van Ryzin ................... 340/988 |
| 5,956,684 | A | | 9/1999 | Ishii et al. ................... 704/275 |
| 6,018,697 | A | * | 1/2000 | Morimoto et al. .......... 701/209 |
| 6,037,936 | A | * | 3/2000 | Ellenby et al. .............. 715/764 |
| 6,061,646 | A | * | 5/2000 | Martino et al. ................. 704/3 |
| 6,081,803 | A | * | 6/2000 | Ashby et al. .................. 707/4 |
| 6,243,675 | B1 | | 6/2001 | Ito .............................. 704/232 |
| 6,385,535 | B2 | * | 5/2002 | Ohishi et al. ............... 701/209 |
| 6,490,521 | B2 | * | 12/2002 | Wiener ....................... 701/211 |
| 6,598,018 | B1 | * | 7/2003 | Junqua ....................... 704/251 |
| 2001/0032070 | A1 | * | 10/2001 | Teicher .......................... 704/2 |

FOREIGN PATENT DOCUMENTS

| | | |
|---|---|---|
| JP | H06-073800 | 3/1994 |
| JP | H06-243391 | 9/1994 |
| JP | H11-219105 | 8/1999 |
| JP | H11-288296 | 10/1999 |
| JP | 2000-089776 | 3/2000 |
| WO | WO 01/04790 A1 | 1/2001 |

OTHER PUBLICATIONS

Language Identification Using Phone-based Acoustic Likelihoods, L.F. Lamel and J.L. Gauvain, Speech and Signal Processing, 1994. ICASSP-94., 1994 IEEE International Conference on Adelaide, SA, Australia, Apr. 19-22, 1994, New York, NY, pp. I-293-I-296.
(Corresponding) Japanese Patent Application No. 2000-114244 Office Action dated Jul. 10, 2006.

* cited by examiner

*Primary Examiner*—Patrick N. Edouard
*Assistant Examiner*—James S. Wozniak
(74) *Attorney, Agent, or Firm*—Brinks Hofer Gilson & Lione

(57) ABSTRACT

A navigation system includes a speech-recognition unit for performing speech-recognition processing on input speech. The system also includes a language-determining unit for determining the language of a speaker based on the contents of the input speech as recognized by the speech-recognition unit. The system further includes a navigation-processing unit for performing a vehicle-installed-type navigation operation corresponding to the language as determined by the language-determining unit.

14 Claims, 12 Drawing Sheets

FIG. 5

INTERSECTION UNIT

| UNIT IDENTIFICATION CODE |
|---|
| #0 INTERSECTION RECORD |
| #0 INTERSECTION DIRECTION INFORMATION RECORD |
| #0 INTERSECTION LANE INFORMATION RECORD |
| #0 INTERSECTION DRAWING RECORD |
| #1 INTERSECTION RECORD |
| #1 INTERSECTION DIRECTION INFORMATION RECORD |
| #1 INTERSECTION LANE INFORMATION RECORD |
| #1 INTERSECTION DRAWING RECORD |
| ⋮ |

FIG. 6

INTERSECTION RECORD

| INTERSECTION INFORMATION FLAG |
|---|
| NUMBER OF CROSSINGS OF INTERSECTION |
| STORAGE POSITION OF CORRESPONDING INTERSECTION DRAWING RECORD |
| DISPLAY COORDINATES OF INTERSECTION NAME/ NORMALIZED LONGITUDE |
| DISPLAY COORDINATES OF INTERSECTION NAME/ NORMALIZED LATITUDE |
| INTERSECTION NAME STRING |
| #0 LINK ID |
| #0 STORAGE POSITION OF INTERSECTION INFORMATION RECORD CORRESPONDING TO THIS LINK |
| ⋮ |

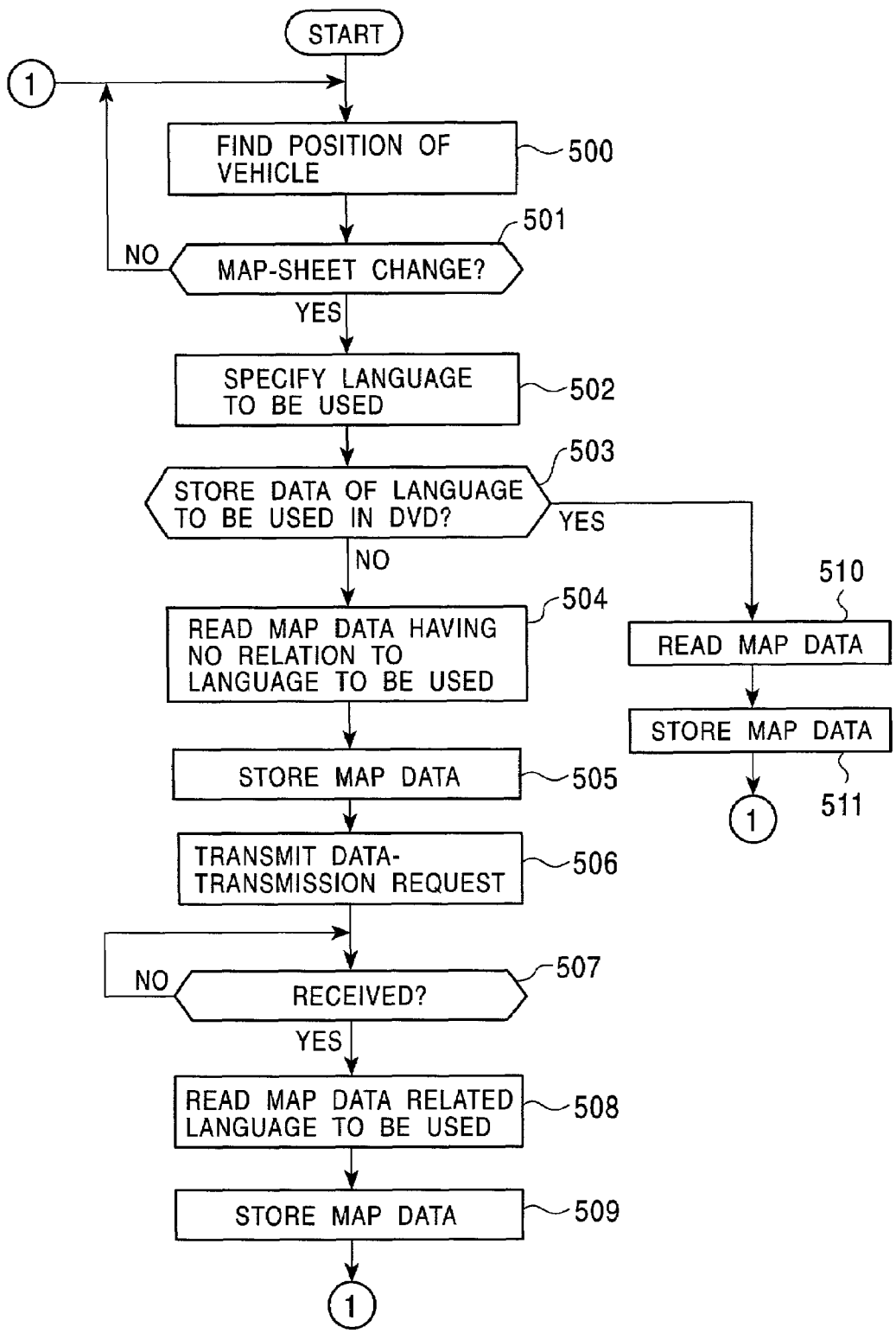

FIG. 14

| LANGUAGE | SYNONYM |
|----------|---------|
| GERMAN | Deutschland |
| DANISH | Tyskland |
| DUTCH | Duitsland |
| ENGLISH | Germany |
| FRENCH | Allemagne |
| ITALIAN | Germania |
| SPANISH | Alemania |
| SWEDISH | Tyskland |

NAVIGATION SYSTEM

BACKGROUND OF THE INVENTION

1. Field of the Invention

The present invention relates to a navigation system for displaying a map showing the vicinity of a user's vehicle and guiding the user along a traveling route through spoken instructions.

2. Description of the Related Art

Generally, navigation systems in vehicles determine the current position of the vehicle and read map data of the vehicle's vicinity from a data storage medium such as a CD or a DVD and then display the data on a screen. A vehicle position mark indicating the position of the vehicle is displayed on the screen. The map data of the vehicle's vicinity is scrolled during traveling of the vehicle. This allows for the vehicle position mark to always be at the center of the screen and for map information showing the vicinity of the vehicle to be understood.

Most of the latest vehicle-installed-type navigation systems are provided with a route-guiding function that enables users to travel to desired destinations without getting lost. According to this route-guiding function, the preferred (or least-cost) route between a starting position and a destination position is automatically determined using map data. This is accomplished using a simulation, such as a breadth-first search (BFS) method or Dijkstra's algorithm. The preferred route is stored as a guiding route. During driving, the screen displays the guiding route by bold lines of a different color than the colors used for the other roads. The next intersection the vehicle will approach is enlarged, and the users are guided to their destination by speech-guiding output.

Since the language used in the above-described conventional navigation system is fixed at the time of purchase, when the languages used by the user and the navigation system are different, the user may be unable to understand the contents of the displayed map and the output guiding speech. For example, when a foreigner who speaks English uses a Japanese-specification navigation system purchased in Japan, the characters contained in the map and the speech guiding are Japanese. When the user crosses borders of countries in Europe or the like when using the navigation system, the user finds it difficult to understand the contents because the map uses the local language of each country. For example, FIG. 14 shows how a synonym for the word "GERMAN" is different for each country.

SUMMARY OF THE INVENTION

The object of the invention is to provide a navigation system which facilitates the user's understanding of the display contents, regardless of the language of the user.

In order to accomplish this objective, one embodiment of the navigation system utilizes a speech-recognition unit to perform speech recognition processing on input speech spoken by a user. The navigation system then utilizes a language-determining unit to determine the language of the user based on the speech recognition result. Navigation processing utilizing the determined language of the user is performed by a navigation-processing unit. Since the navigation processing unit performs a predetermined navigation operation utilizing the language of the user, the user can easily understand display and output speech of the navigation operation.

In another embodiment, the navigation processing system is provided with a map displaying unit displaying map information showing the vicinity of the vehicle. The map displaying unit preferably uses the language of the user as determined by the language determining unit for the language of the displayed map information. By using the language of the user for the map information, the contents of the map information can be easily understood.

In yet another embodiment, the navigation processing unit is provided with a route-searching unit and a route-guiding unit. The route-guiding unit preferably generates guiding speech corresponding to the language of the user. Since the guiding speech is in the language of the user, the user can understand easily.

In one embodiment, even when the user speaks in more than one language, by examining each word in the input speech, the language determining unit identifies the user's most frequently spoken language.

In another embodiment, the language determining unit includes a database which stores the identifying features of the language spoken by the user. This allows the language of the user to be identified. The use of such a database allows determination accuracy to be increased.

In yet another embodiment, when an image of a captured predetermined road guiding board (i.e., road sign) is inputted, an image recognition unit determines the contents of the characters contained in this image. In this embodiment, the navigation processing unit includes a guiding unit for performing at least one of displaying and/or speech-outputting features. The guiding unit replaces the characters, which are not in the user's language and whose contents are determined by the image recognition unit and language determining unit, with other corresponding characters in the user's language having the same meaning. Even though the contents of the road guiding board are in the local language, which is different from the language of the user, the user can understand the contents of the guiding board.

In one embodiment, transmission of detailed information dependent on the user's language as determined by the language determining unit, is requested by a transmission request unit. The detailed information transmitted from outside in accordance with this request is received by an information receiving unit. Since the only information which needs to be provided is the information for determining the user's language, the amount of information corresponding to each of the potentially spoken languages can be decreased. In this manner, the amount of storage medium can be reduced, which can achieve cost saving. In addition, since the amount of information that can be stored is restricted, by decreasing the amount of information that must always be stored, the number of identifiable languages can be increased.

Further objects, features and advantages of the present invention will become apparent from the following description of the preferred embodiments with reference to the attached drawings.

BRIEF DESCRIPTION OF THE DRAWINGS

FIG. 5 is a diagram illustrating the detailed contents of an intersection unit;

FIG. 6 is a diagram illustrating the detailed contents of an intersection record;

FIG. 13 is a flowchart illustrating an operation procedure for an embodiment in which the map data corresponding to the user's language is obtained by means of communication; and FIG. 14 is a diagram illustrating variations of synonyms and notations in a plurality of languages.

DESCRIPTION OF THE PREFERRED EMBODIMENTS

A navigation system according to one embodiment to which the present invention is applied will now be described with reference to attached drawings.

(1) Construction of the Navigation System

Figure 1:
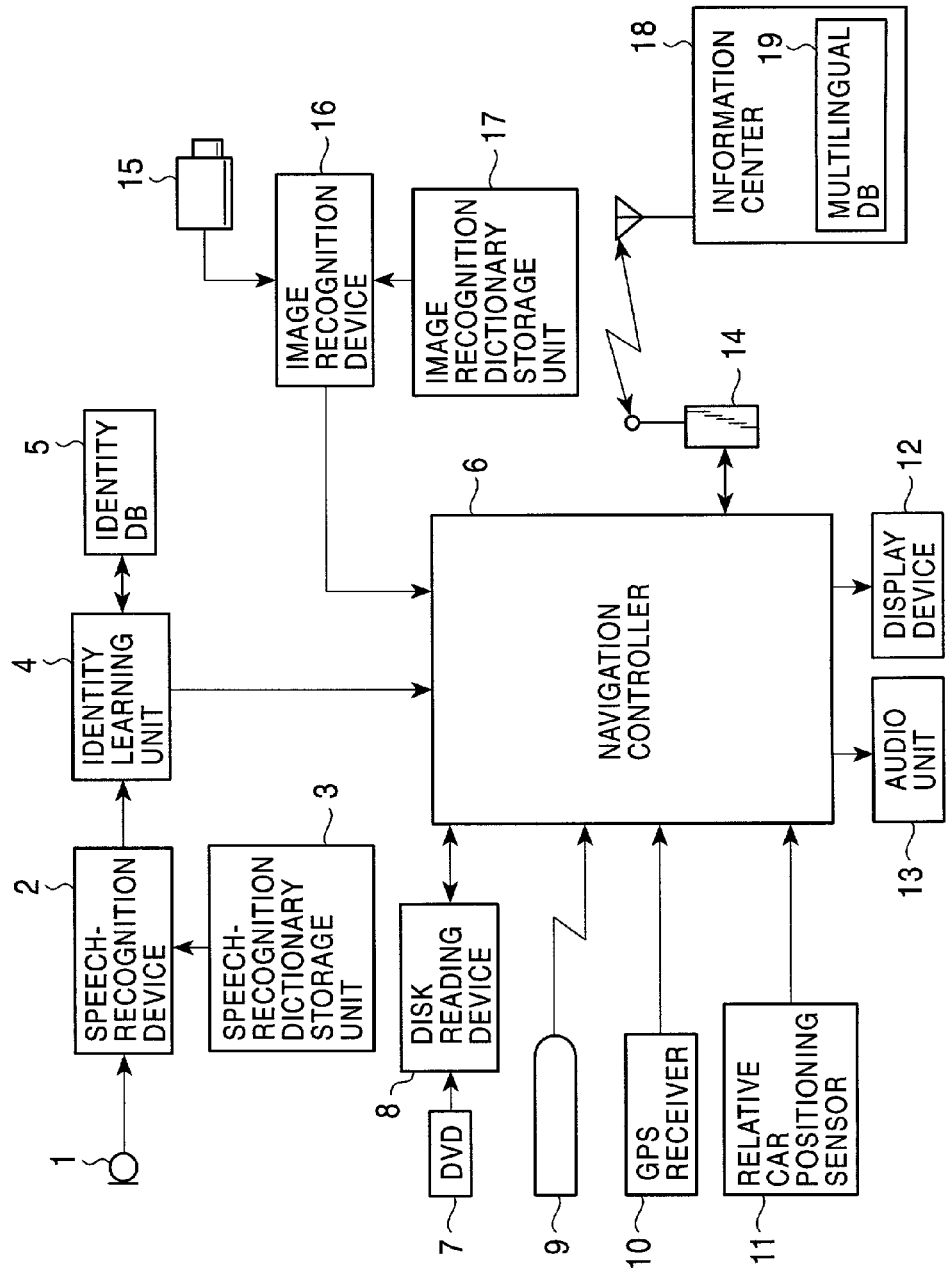
FIG. 1 is a block diagram illustrating the construction of a vehicle-installed-type navigation system according to one embodiment of the invention.

FIG. 1 is a diagram showing the construction of a vehicle-installed-type navigation system according to one embodiment to which the present invention is applied. The navigation system shown in FIG. 1 comprises a microphone 1, a speech-recognition device 2, a speech-recognition dictionary storage unit 3, an identity-learning unit 4, an identity database (DB) 5, a navigation controller 6, a DVD (Digital Versatile Disc) 7, a disc-reading device 8, a remote control (RC) unit 9, a GPS (Global Positioning System) receiver 10, a relative car positioning sensor 11, a display device 12, an audio unit 13, a mobile phone 14, a camera 15, an image-recognition device 16, an image-recognition dictionary storage unit 17, and an information center 18.

The microphone 1 converts the speech spoken by the user into an electric signal and outputs the converted signal. The speech-recognition device 2 performs predetermined speech recognition by analyzing an audio signal output from the microphone 1. The speech-recognition device 2 specifies a character string corresponding to speech spoken by a user to determine the user's language based on this character string.

The speech-recognition dictionary storage unit 3 stores signal waveforms corresponding to standard speech and, in addition, stores a dictionary indicating languages of the words corresponding to the signal waveforms. The dictionary is accommodated with a plurality of potential user languages.

The identity-learning unit 4 acquires the determination result, output from the speech-recognition device 2, identifying the language spoken by the user. The identifying-learning unit 4 learns the frequencies of occurrence of languages spoken by the user. The learning result is stored in the identity DB 5. Whenever speech is inputted, the identity-learning unit 4 acquires the determination result identifying the language spoken by the user and updates the contents of the identity DB 5.

The navigation controller 6 performs various types of controls in order to perform a predetermined navigation operation. A detailed construction of the navigation controller 6 is described below.

The DVD 7 stores various types of map data required for map displaying, route searching, and the like. The disc-reading device 8 has one or more DVDs 7 mountable therein. The disc-reading device 8 reads the map data from any of the DVDs 7 under the control of the navigation controller 6. It should be noted that the mountable discs do not have to be DVDs or CDs. It should also be noted that both DVDs and CDs may be selectively mountable.

The remote control unit 9 is provided with various operation keys such as a search key for instructing route searching, a route guiding mode key for route-guiding mode setting, a destination input key, a left-right-up-down cursor key, a map reducing/enlarging key, and a setting key for setting an item on the display screen indicated by the cursor. An infrared signal is transmitted toward the navigation controller 6 when the keys are utilized.

The GPS receiver 10 receives electric waves transmitted from a plurality of GPS satellites. The GPS receiver 10 computes the absolute position and the direction of the vehicle by performing three-dimensional or two-dimensional position-measuring processing (computes the direction of the vehicle based on the current position of the vehicle and the position of the vehicle one sampling time ΔT before the current position). The GPS receiver 10 outputs the position and direction results along with the measured time. The relative car positioning sensor 11 is provided with an angular sensor, such as a vibration gyro, for finding the vehicle rotation angle as a relative direction. The relative car positioning sensor 11 is also provided with a distance sensor which outputs one pulse per a predetermined distance traveled. Thus, the relative position and the direction of the vehicle may be found.

The display device 12 displays map information regarding the vicinity of the vehicle based on the drawing data output from the navigation controller 6. The display device 12 superposes and displays the guiding route, predetermined guiding images, and the like on this map. The audio unit 13 performs speech output, such as intersection-guiding speech, based on speech data output received from the navigation controller 6.

The mobile phone 14 is connected to the navigation controller 6 via an external data input/output unit provided in the main body of the phone. The mobile phone 14 is used for receiving various data from the information center 18 by transmitting and receiving the electric waves to and from a ground station in the vicinity of the vehicle. A cellular mobile phone, a PHS, or the like can be used as the mobile phone 14.

The camera 15, which is provided in a predetermined position in the vehicle, primarily captures road guiding boards ahead of the vehicle.

The image-recognition device 16 performs predetermined image-recognition processing on the road guiding board image shot by the camera 15. The image-recognition device 16 recognizes the guiding contents, including strings contained in this image, to extract road shapes, place names, and the like. The image-recognition dictionary storage unit 17 stores, as an image-recognition dictionary, standard contrast image data to allow the image-recognition device 16 to recognize the contents of road guiding boards.

The information center 18 transmits map data, which can contain a plurality of languages, when a transmission request from the navigation controller 6 is received. The information center 18 has a multilingual DB 19 therein. The multilingual DB 19 stores map data in a plurality of languages, such as English, German, French, and Japanese.

Figure 2:
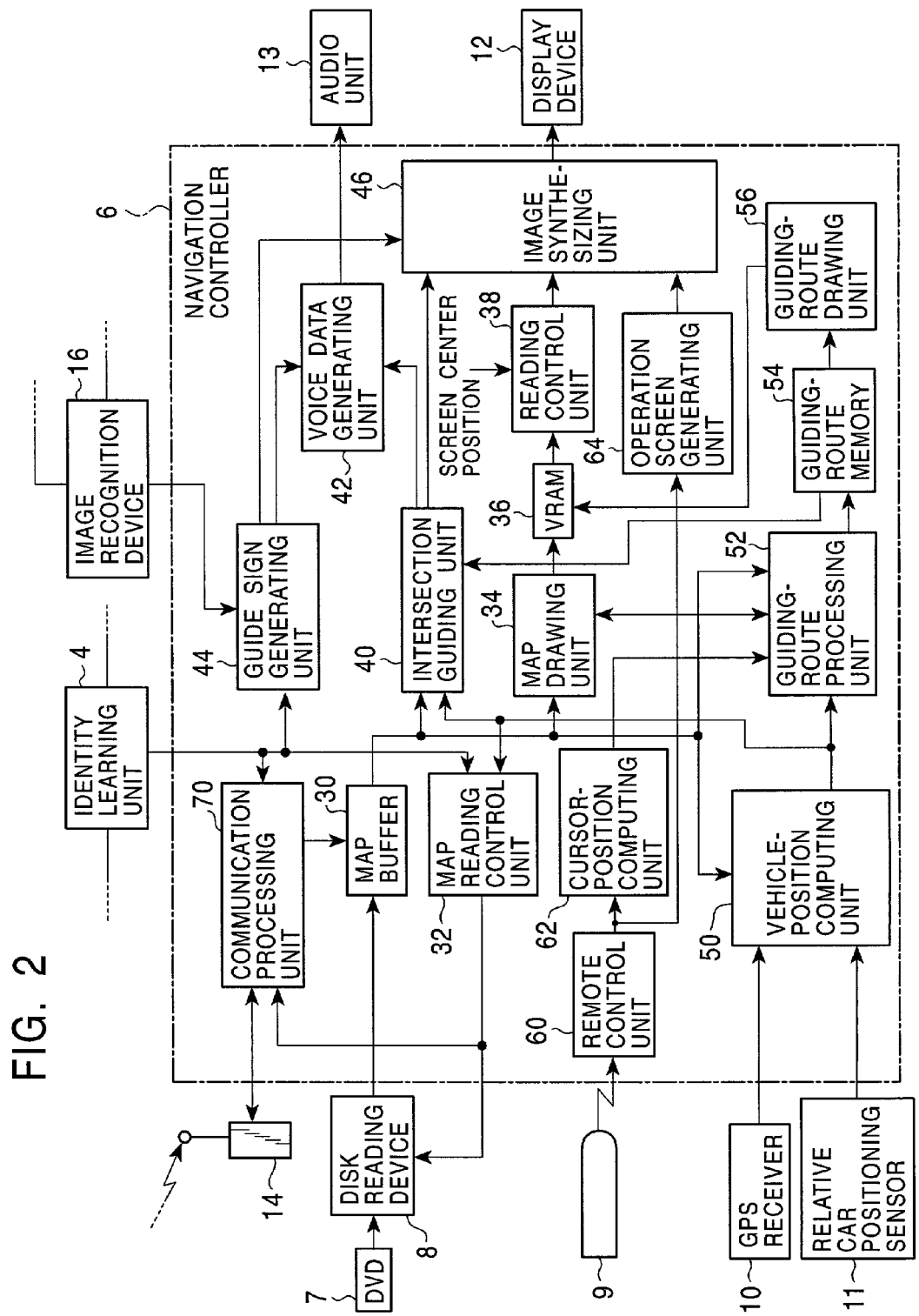
FIG. 2 is a block diagram illustrating the detailed construction of the navigation controller.

FIG. 2 is a diagram showing the detailed construction of the above navigation controller 6. The navigation controller 6 shown in the diagram is provided with a map buffer 30 for displaying a predetermined map image, enlarged views of an intersection, and the like on the display device 12. The navigation controller 6 is capable of outputting intersection guiding speech. The navigation controller 6 is also provided with a map reading control unit 32; a map drawing unit 34; a VRAM 36; a reading control unit 38; an intersection guiding unit 40; a speech-data generating unit 42; a guide-sign generating unit 44; an image-synthesizing unit 46; and a vehicle-position computing unit 50. The vehicle position computing unit 50 is capable of computing the position of the vehicle, performing map-matching processing, route-searching processing, route-guiding processing, and displaying the results. Additionally, the navigation controller 6 is provided with a route-searching processing unit 52; a guiding-route memory 54; a guiding-route drawing unit 56; and a remote control unit 60, for displaying various operation screens for the user, and transmitting operation instructions from the remote control unit 9 to each component thereof. The navigation controller 6 is further provided with a cursor-position computing unit 62; an operation screen generating unit 64; and a communication processing unit 70, for transmitting and receiving data from the information center 18 via the mobile phone 14.

The map buffer 30 temporarily stores map data read from the DVD 7 by the disc-reading device 8. When the vehicle-position computing unit 50 computes the position of the vehicle, the map reading control unit 32 sends to the disc-reading device 8 a reading request for map data having a predetermined range including the vehicle position. Additionally, the map reading control unit 32 reads map data, required for map displaying, from the DVD 7 and stores map data in the map buffer 30.

The map drawing unit 34 generates map drawing data required for map display based on a drawing unit included in the map data which is stored in the map buffer 30. The generated map drawing data is stored in the VRAM 36. The reading control unit 38 reads one screen of map drawing data corresponding to the vehicle position or reads the cursor position and outputs the data to the image-synthesizing unit 46.

Figure 3:
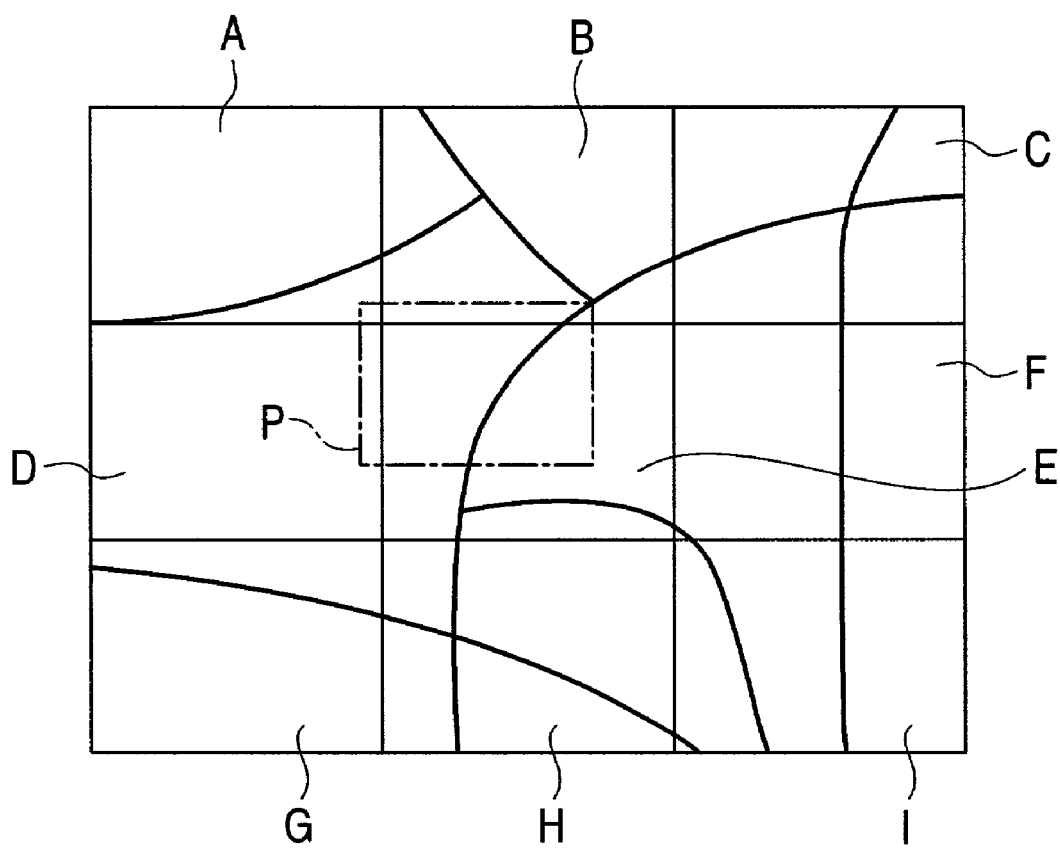
FIG. 3 is the relationship between map drawing data stored in a VRAM and a display image read by a reading control unit.

FIG. 3 is a diagram showing the relationship between the map drawing data stored in the VRAM 36 and the display image read by the reading control unit 38. In FIG. 3, regions A through I are generated map images based on nine sheets of map data read from the map buffer 30. The nine sheets of map drawing data are stored in the VRAM 36. A region P is a predetermined region based on the center position of the screen. While information is being displayed, a map image corresponding to the region P is read by the reading control unit 38 and displayed on the screen of the display device 12 via the image-synthesizing unit 46.

Thus, scrolling of the map image occurs as the region P moves in accordance with the movement of the screen center position. When the screen center position departs from the center region E, nine sheets of map data each centering on a region (any of A to D or F to I) including the screen center position at this time, are newly read and are stored in the map buffer 30.

The intersecting guiding unit 40 lets the user know, using display images and speech, the intersection that the vehicle is approaching. During route guiding, when the vehicle moves within a predetermined distance from the intersection ahead, image data corresponding to the guide map (the enlarged view of the intersection and the traveling direction arrow) of this approaching intersection is generated. At the same time, information concerning the traveling direction and the like are output to the speech-data generating unit 42. The speech-data generating unit 42 outputs speech data, based on information such as the traveling direction input from the intersection guiding unit 40, to the audio unit 13 to guide the traveling direction by speech.

The guide-sign generating unit 44 generates a predetermined guide-sign image based on the information output from the image-recognition device 16 such as the strings concerning the road shapes, and the place names. The image-synthesizing unit 46 performs image synthesizing to output synthesized data to the display device 12. It does this by superposing the map drawing data read from the VRAM 36, and from image data from each of the guide-sign generating unit 44, the guiding-route drawing unit 56, and the operation screen generating unit 64. When drawing data corresponding to the intersection guide map, such as the enlarged view of the intersection, is outputted from the intersection-guiding unit 40, the image-synthesizing unit 46 outputs this drawing data using the display device 12.

The vehicle-position computing unit 50 computes the position of the vehicle based on the data received from the GPS receiver 10 and the relative car positioning sensor 11. It also performs map-matching processing to modify the vehicle position in situations in which the computed vehicle position is located on a road which is not in the map data. The route-searching processing unit 52 searches for a traveling route establishing a connection between a predetermined destination position and a starting position under predetermined conditions. The preferred (least cost) guiding route is determined by various conditions such as shortest distance or shortest time. A route-searching method such as a breadth-first search (BFS) method, or a Dijkstra's algorithm, may be used. The determined guiding route is stored in the guiding-route memory 54.

The guiding-route drawing unit 56 selects what is included in the map area drawn in the VRAM 36 from among the guiding-route data. The guiding-route data is set by the route-searching processing unit 52 and is stored in the guiding-route memory 54. Thereafter, the guiding-route drawing unit 56 draws the guiding route in bold lines, superposed on the map image in a predetermined color.

Speech recognition means include the speech-recognition device 2 and the speech-recognition dictionary storage unit 3. Language determining means include the identity-learning unit 4 and the identity DB 5. Navigation processing means include the navigation controller 6, the DVD 7, the disc-reading device 8, the GPS receiver 10, the relative car positioning sensor 11, the display device 12, and the audio unit 13. Map displaying means include the DVD 7, the disc-reading device 8, the GPS receiver 10, the relative car positioning sensor 11, the display device 12, the map buffer 30, the map reading control unit 32, the map drawing unit 34, the VRAM 36, the reading control unit 38, and the vehicle-position computing unit 50. Route searching means include the route-searching processing unit 52. Route-guiding means include the guiding-route memory 54, the intersection guiding unit 40, and the speech-data generating unit 42. Image-recognition means include the image-recognition device 16 and the image-recognition dictionary storage unit 17. Guiding means include the guide-sign generating unit 44 and the speech-data generating unit 42. Transmission-request means and information-receiving means include the mobile phone 14 and the communication processing unit 70.

(2) Detailed Contents of the Map Data

Figure 4:
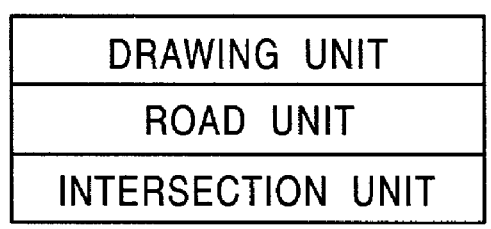
FIG. 4 is a diagram showing the contents of each sheet of map data.

The map data recorded on the DVD 7 is described below. The map data recorded on the DVD 7 utilizes, as a unit, a rectangular sheet defined by predetermined longitude and latitude. Each sheet of map data can be identified and read by specifying the sheet number. FIG. 4 is a diagram showing the content of the map data for each sheet. As shown in FIG. 4, the map data for each sheet includes (1) the drawing unit having various data required for map displaying, (2) a road unit having data required for various processing such as map matching, route searching, and route guiding, and (3) an intersection unit having detailed data concerning intersections.

The above drawing unit includes background layer data for displaying items such as buildings, and rivers. It also includes character layer data for displaying the names of items such as cities, towns, villages, and road names. Character layer data is provided for each language. When the language used is determined, the character layer corresponding to this language is utilized.

In the above road unit, a connection between two arbitrary points on the road is called a link, and a neighboring point establishing a connection between two or more links is called a node. The road unit includes a unit header for identifying it as the road unit, a connection node table for storing detailed data of all nodes, and a link table storing detailed data of the link specified by two neighboring nodes.

FIG. 5 is a diagram showing detailed contents of the intersection unit. As shown in FIG. 5, for each intersection, the intersection unit stores an intersection record including data concerning the intersection itself. It also stores an intersection direction information record including data concerning the destination of a road extending from the intersection. Further, it stores an intersection lane information record including data concerning each lane of the roads constituting the intersection.

As shown in FIG. 6, for each existing intersection, the intersection record includes:

a. an "Intersection Information Flag" which includes a signal flag that indicates whether a traffic light exists at this intersection;

b. a "Number of Crossings of Intersection" indicator establishing the number of crossings of the intersection;

c. the coordinates of the intersection name in the situation in which the intersection name is displayed;

d. the intersection name string to be displayed; and e. the link ID of each link constituting the intersection, and the storage position of the intersection direction information record corresponding to the link (for each of the crossings of the intersection).

The intersection unit data is provided for each language so that the user's language may be used. For example, the intersection drawing records and the intersection name strings within the intersection records are provided in each language. When the language of the user is determined, the contents corresponding to this language are read.

(3) Operation of the Navigation System

The operation of the navigation system according to the present embodiment is categorized and described below.

(3-1) Determining Operation of Language Used

Figure 7:
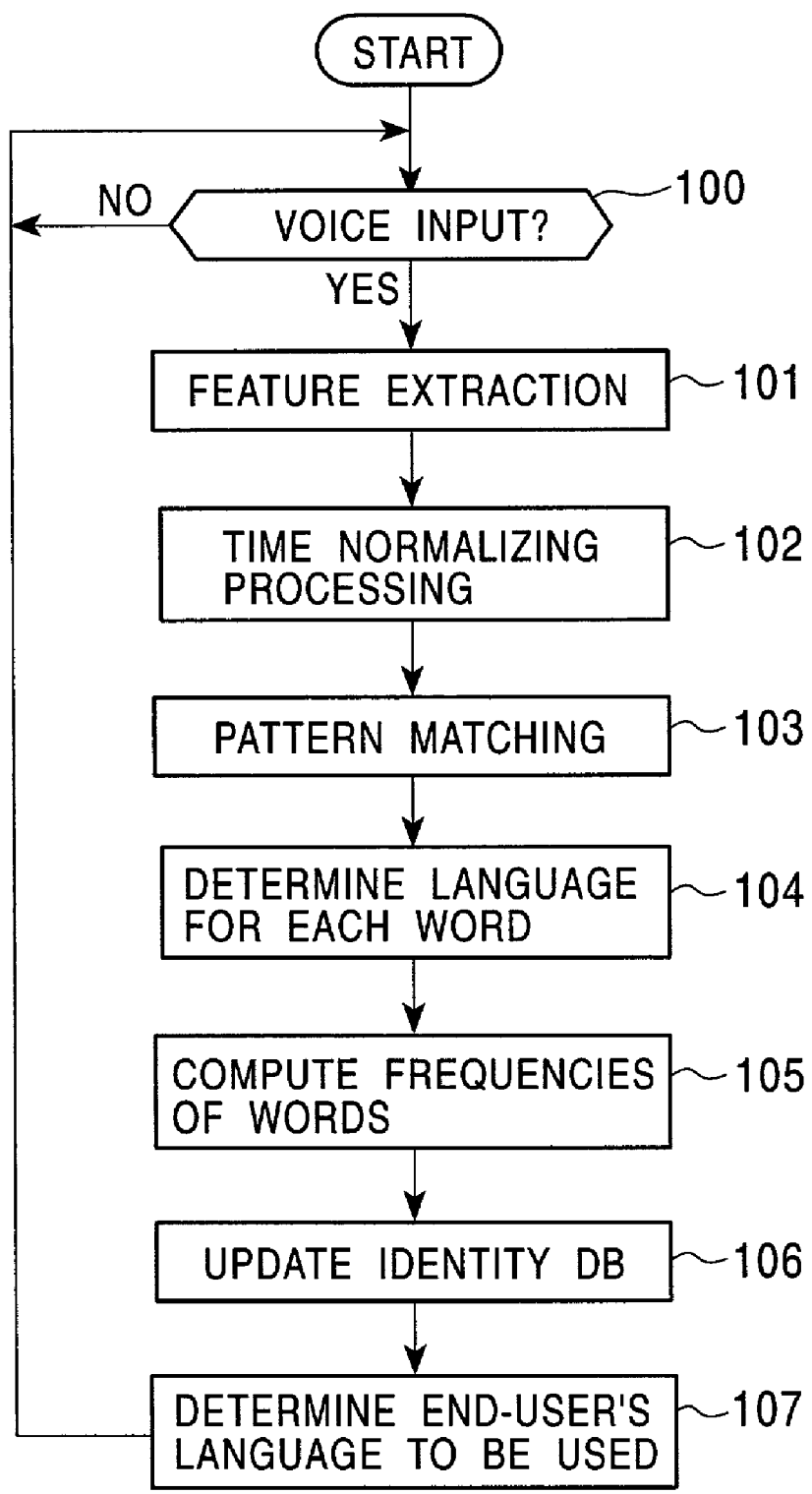
FIG. 7 is a flowchart illustrating an operation procedure for determining a language used by a user.

FIG. 7 is a flowchart showing an operation sequence for determining the language spoken by the user. The operation sequence is shown for recording the speech of the user (a driver or another accompanying person) utilizing, for example, the microphone 1 provided in a predetermined position inside the vehicle, to determine the language spoken by the user.

The speech-recognition device 2 determines whether speech is inputted into the microphone 1 (act 100). When the speech of the user is inputted, the feature of this speech is extracted (act 101). During the speech of the user, the duration of each spoken word varies. Hence, the speech-recognition device 2 performs normalization processing on the extracted feature with respect to the time base (act 102). Thereafter, the speech-recognition device 2 performs pattern matching based on information contained in a dictionary stored in the speech-recognition dictionary storage unit 3 (act 103). In such a manner, the language each word is spoken in is determined (act 104).

The identity-learning unit 4 counts the number of occurrences for each language, based on the word-by-word determination of the speech-recognition device 2, and computes the frequencies of occurrence for each language (act 105). The contents of the identity DB 5 are updated (act 106). For example, when the user speaks the same word several times, the count of occurrences for the particular language the word is spoken in is increased.

The identity-learning unit 4 determines the language spoken by the user based on the frequency of occurrence for each of the languages stored in the identity DB 5 (act 107). For example, when a user speaks Japanese, words are imported using the KATAKANA notation that phonetically imitate English synonyms. Although these imported words are determined to be English, the occurrence of native Japanese is more frequent than the occurrence of the imported words during a common conversation. Accordingly, the frequency distributions of the languages stored in the identity DB 5 establish that Japanese is the majority in the distribution. As a result, during the determining process of the language shown in act 107, the language spoken by the user is determined as being "Japanese".

In this manner, this embodiment of the navigation system can determine the language for every word spoken by the user by performing speech-recognition processing. The language spoken by the user can be easily determined by computing the frequencies of occurrence for each language on a word-by-word basis and examining the language having the highest frequency of occurrence.

In the above embodiment, the determination of the user's language is made without considering whether there is more than one user speaking. The language spoken by multiple users may be determined for each individual user by causing the speech-recognition device 2 to extract the features from each user and storing data of the identity DB 5 for each user. In this manner, the language used by each user can be accurately determined.

(3-2) Map Displaying Operation in the Vicinity of the Vehicle

Figure 8:
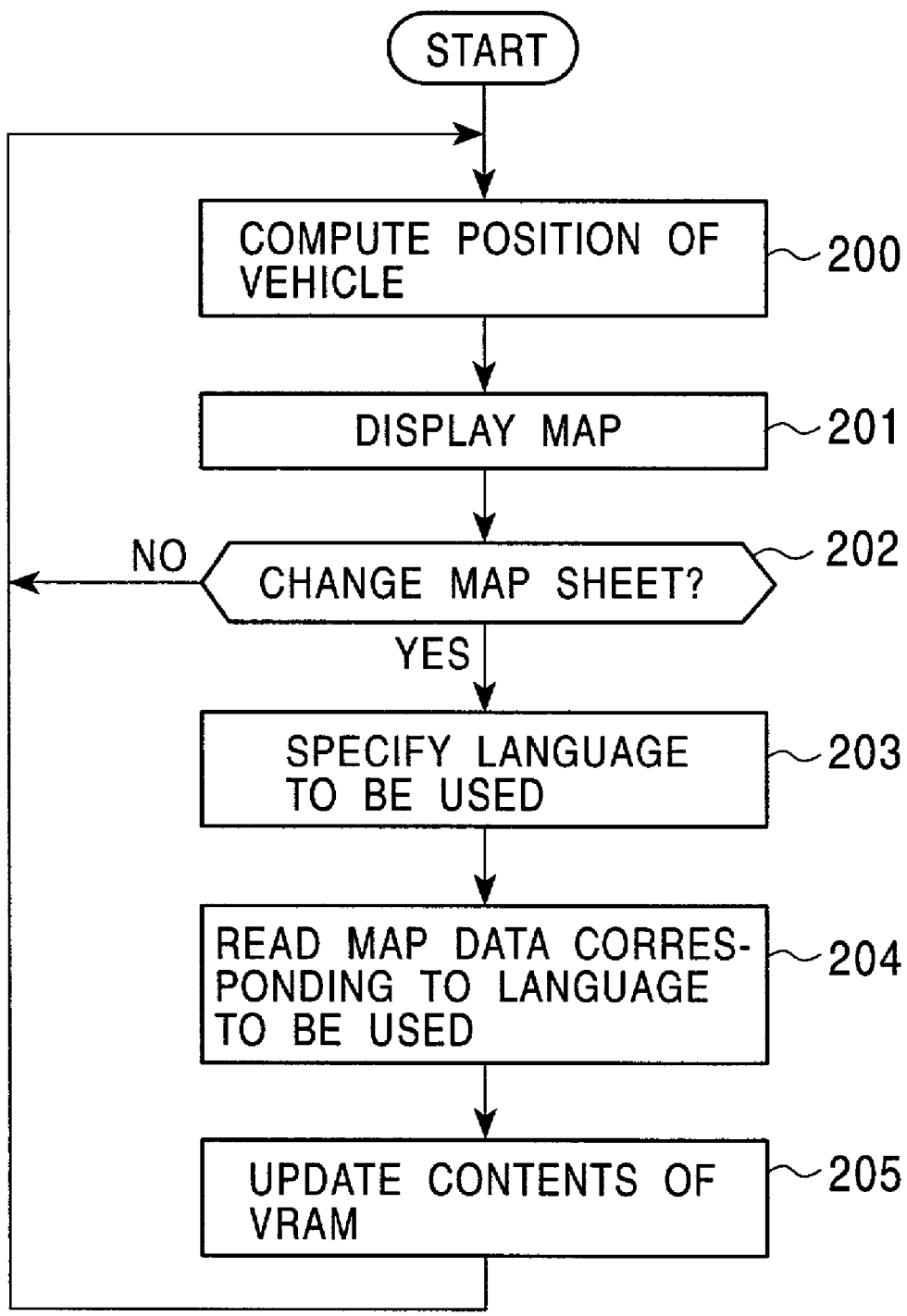
FIG. 8 is a flowchart illustrating an operation procedure for displaying a map image of the surrounding vicinity of the vehicle during driving.

FIG. 8 is a flowchart showing an operation procedure for displaying a map image of the vicinity of a vehicle during driving. The vehicle-position computing unit 50 computes the current position of the vehicle based on the output of the GPS receiver 10 and the relative car positioning sensor 11 (act 200). The current position of the vehicle is inputted into the reading control unit 38 as the screen center position. The reading control unit 38 reads a predetermined range of map drawing data including the current position of the vehicle from the VRAM 36 to show the read data on the display device 12 (act 201). When the position of the vehicle moves, the range of the map drawing data read from the VRAM 36 is changed accordingly. As a result, the map image of the vicinity of the vehicle which is displayed on the display device 12 is scrolled while the vehicle travels.

The map reading control unit 32 determines whether a new sheet of map data must be read from the DVD 7 whenever the current position of the vehicle changes (act 202). As is shown in FIG. 3, when the region P moves in accordance with traveling of the vehicle, map data corresponding to the sheets provided in the traveling direction must be sequentially read.

When a new sheet of map data is read, an affirmative determination is made (act 202). Thereafter, the map reading control unit 32 specifies the language spoken by the user based on the determination result of the identity-learning unit 4 (act 203). The map reading control unit 32 requests the disc-reading device 8 to read map data corresponding to the user's determined language. The disc-reading device 8 reads map data from the DVD 7 in accordance with this request (act 204). Among the map data read in this manner, only the map data corresponding to the user's determined language is read. For example, only data corresponding to the speaker's language is read from the character string layer included in the drawing unit, is read from the intersection drawing record included in the intersection unit, and is stored in the map buffer 30.

When the contents of the map data stored in the map buffer 30 are updated, the map-drawing unit 34 generates map drawing data based on the updated map data to update the contents of the VRAM 36 (act 205). Thereafter, the process returns to the above act 200 and repeats processing.

According to the present embodiment when the navigation system reads a new sheet of map data during traveling of the vehicle, the map data corresponding to the language spoken by the user is read. Accordingly, when the map image showing the vicinity of the vehicle is displayed, since the characters corresponding to the language spoken can be used, the user can easily understand the display contents. In particular, since the determination of the user's language is automatically performed using speech-recognition processing, there is no need to perform other language functions after the determination, which can improve the operationality of the system.

Figure 9A:
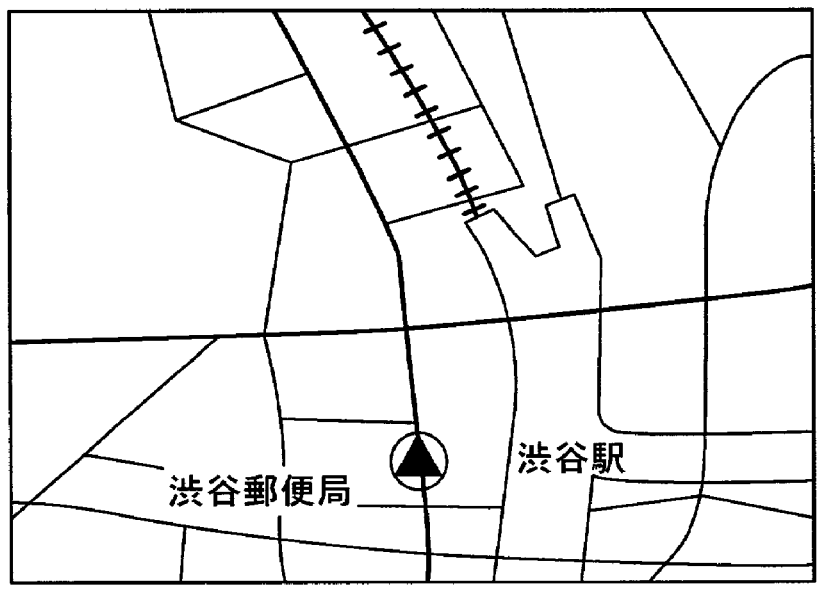
FIGS. 9A and 9B are diagrams illustrating example displays of the map image showing the vicinity of the vehicle.
Figure 9B:
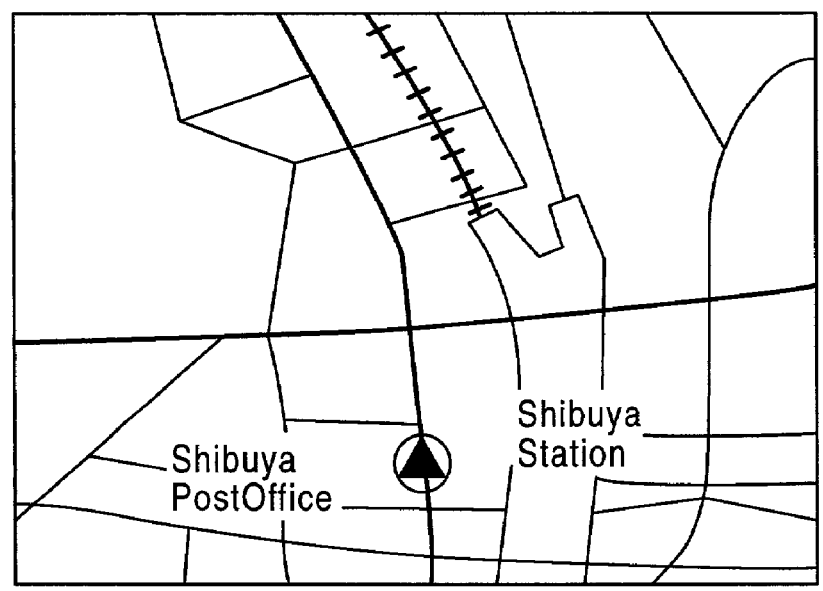

FIGS. 9A and 9B are diagrams showing example displays of the map image of the vicinity of the vehicle. The example display shown in FIG. 9A corresponds to a case in which the user speaks Japanese. The character string layer included in the drawing unit corresponding to Japanese is utilized, which causes the notations of the place names and the facility names to be in Japanese. An example display shown in FIG. 9B corresponds to a case in which the user speaks English. The character string layer included in the drawing unit corresponding to English is utilized, which causes the notations of the place names and the facility names to be in English. Since the same background layer data is utilized regardless of the language used, the two example displays shown in FIGS. 9A and 9B are identical except for the characters.

(3-3) Intersection Guiding Operation in Route Guiding

Figure 10:
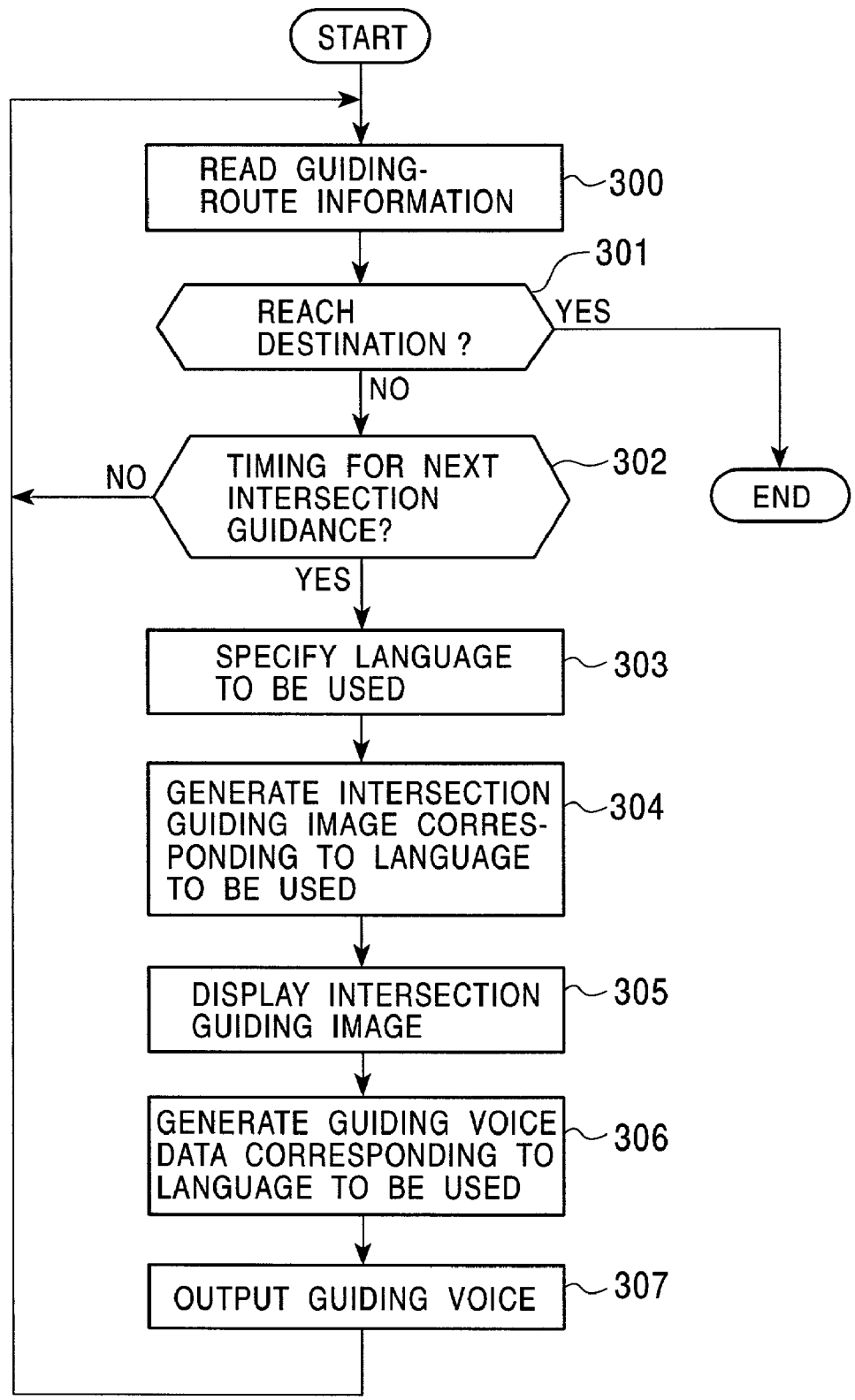
FIG. 10 is a flowchart illustrating an operation procedure for performing intersection guiding during route guiding.

FIG. 10 is a diagram showing an operation procedure for performing an intersection-guiding operation in route guiding. The route-searching processing unit 52 performs searching processing on the route established between a predetermined starting position and a destination position. The route information is stored as the searching result in the guiding route memory 54.

The intersection-guiding unit 40 reads the route information stored in the guiding route memory 54 (act 300) and determines when the vehicle reaches the destination. This is accomplished by comparing the coordinates of the destination with the coordinates of the current position of the vehicle as computed by the vehicle position computing unit 50 (act 301). When the vehicle reaches the destination, the intersection guiding operation in a sequence of route guiding is completed.

When the vehicle does not reach the destination, the intersection-guiding unit 40 determines whether intersection guidance is needed (act 302). For example, when the guide timing is programmed for when the distance to a next right-turn/left-turn intersection reaches a predetermined value, when the predetermined value is reached, a positive determination is made in act 302 and the intersection guidance operation continues. Otherwise, a negative determination is made at act 302. The process then returns to act 300 and repeats processing.

When intersection guidance is desirable, the intersection guiding unit 40 specifies the language spoken by the user as determined by the identity learning unit 4 (act 303), generates the intersection guiding image corresponding to the specified language used (act 304), and shows the image on the display device 12 (act 305). The intersection guiding unit 40 requests the speech-data generating unit 42 to generate speech guiding data corresponding to the specified language used. The speech-data generating unit 42 generates speech data corresponding to the language spoken by the user and inputs the generated data into the audio unit 13 (act 306). The intersection guiding speech utilizing the language spoken by the user is outputted from the audio unit 13 (act 307). Thereafter, the process returns to act 300 and repeats the processing.

Thus, the navigation system of the present embodiment performs intersection guidance by the use of a guiding image and guiding speech utilizing the language spoken by the user during route guiding. As a result, the user can understand the contents of the intersection guiding regardless of the user's language.

Figure 11:
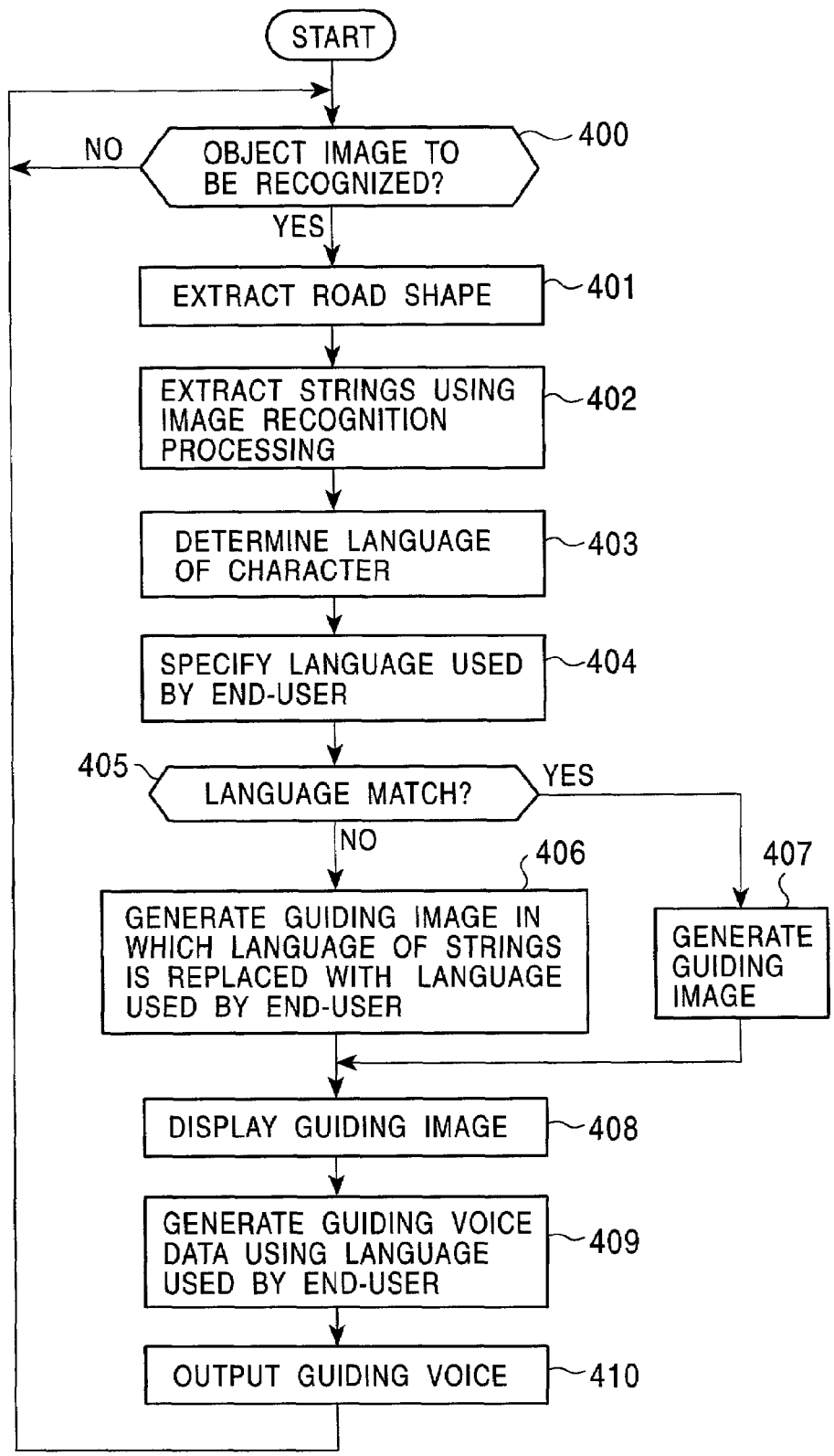
FIG. 11 is a flowchart illustrating an operation procedure for an embodiment in which the contents of a road guiding board captured during driving are read, and guiding is performed based on the read contents.

(3-4) Operation in Which Contents of Road Guiding Board Are Read Using Image-Recognition Processing FIG. 11 is a flowchart showing an operation procedure for an embodiment in which the contents of the road guiding board captured during driving are read and guiding performed based on the contents of the board.

The image-recognition device 16 determines whether an image to be recognized is captured by the camera 15 during driving (act 400). When the image to be recognized is inputted from the camera 15, an affirmative determination is made and the road shape and character strings, such as place names, contained in the road guiding board are extracted (acts 401 and 412). In an embodiment in which there is no image to be recognized, a negative determination is made in act 400 and the process repeatedly determines whether the image to be recognized is captured. The road guiding board normally includes the character strings of place names along with a figure representing the road on a blue or green rectangular plate. The image-recognition device 16 obtains the object that has the characteristics of a road guiding board and determines the object is the image to be recognized.

The image-recognition device 16 performs matching determination by comparing the extracted string image with the character images registered in the image-recognition dictionary storage unit 16 to determine the language of the characters (act 403).

The guide-sign generating unit 44 specifies the language spoken by the user as determined by the identity-learning unit 4 (act 404). It then determines whether the specified language spoken by the user and the language of the strings contained in the road guiding board match (act 405). When mismatch occurs, a negative determination is made. Thereafter, the guide-sign generating unit 44 generates a guiding image obtained by replacing the language of the strings contained in the road guiding board with the language spoken by the user (act 406). It then displays the generated image on the display device 12 (act 408). When the language spoken by the user and the language of the strings contained in the road guiding board match, the guiding image is generated without replacing the language of the strings (act 407). In this embodiment, the original image of the road guiding board obtained by the image-recognition device 16 may continue to be displayed, or the contents of the recognized strings may be redisplayed with a predetermined font.

The guide-sign generating unit 44 requests the speech-data generating unit 42 to generate the guiding speech data explaining the contents of the road guiding board utilizing the language spoken by the user. The speech-data generating unit 42 generates the speech data corresponding to the language spoken by the user in accordance with the request and inputs the generated speech data into the audio unit 13 (act 409). The intersection guiding speech is outputted from the audio unit 13 utilizing the language spoken by the user (act 410). The guiding speech includes, for example, the road shape and the place name corresponding to the character string contained in the guiding speech. Thereafter, the process returns to act 400 and repeats the processing.

The navigation system of this embodiment can determine the language of the strings contained in the road guiding board by capturing the road-guiding board utilizing the camera 15 and performing image-recognition processing on its contents. When the language of the road guiding board is different than the language of the user, the guiding image display and/or the guiding speech output corresponding to the road guiding board is performed utilizing the language spoken by the user. As a result, the user can understand the contents of the road-guiding board.

Figure 12A:
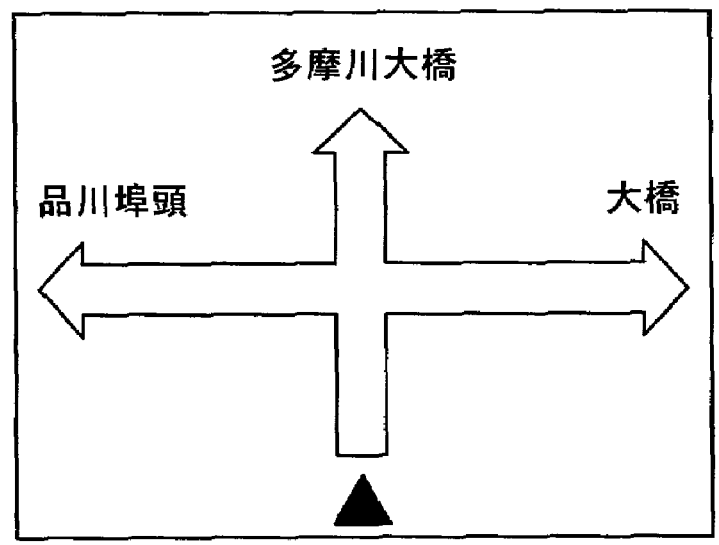
FIGS. 12A and 12B are example displays of a guiding image corresponding to a road guiding board.
Figure 12B:
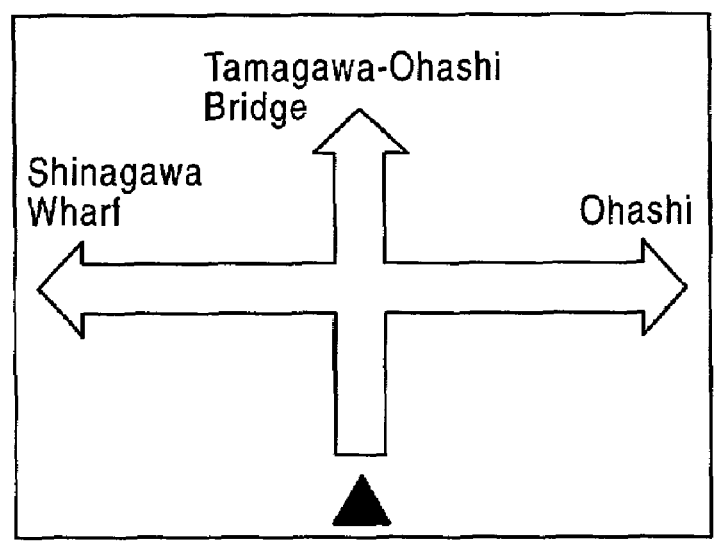

FIGS. 12A and 12B are diagrams showing example displays of the guiding image corresponding to the road guiding board. FIG. 12A shows an example display for an embodiment in which Japanese character strings are contained in the road guiding board and user speaks Japanese. FIG. 12B shows an example display for an embodiment in which English strings are contained in the road guiding board and the user speaks English. In the image shown in FIG. 12B, the language of the strings contained in the image of FIG. 12A is changed from Japanese to English. As a result, even a user who speaks better English than Japanese can easily understand the contents of the road guiding board. When the language of the strings contained in the road-guiding board are matched with the language spoken by the user, since the user may not know the local language notations, the string utilizing the local language notation may be shown adjacent to the replaced place name or symbol to aid the user.

(3-5) Operation in which Map Data Corresponding to the Language Spoken By the User is Obtained by Communication Means There is a large amount of data regarding information such as place names, and facility names. It is difficult to store such data in a large number of varying languages in the DVD 7. Additionally, users utilizing the navigation system may not speak many languages. Accordingly, with respect to data detailing a plurality of potential languages spoken by the user, the minimum data required for determining the language spoken by the user is stored in the DVD 7. The less frequently utilized data, such as place names, and facility names is preferably sent from the information center 18 whenever needed.

FIG. 13 is a flowchart showing an operation procedure for an embodiment in which map data corresponding to the language spoken by the user is obtained by communication means. When the vehicle-position computing unit 50 computes the current position of the vehicle (act 500), the map-reading control unit 32 determines whether a new sheet of map data needs to be read from the DVD 7 (act 501). This determination is performed in the same manner as the determination operation in act 202 shown in FIG. 8.

When a new sheet of map data needs to be read, an affirmative determination is made in act 501. Thereafter, the map reading control unit 32 specifies the language spoken by the user based on the determination result of the identity-learning unit 4 (act 502) and determines whether map data corresponding to the user's language is stored in the DVD 7 (act 503). For example, the DVD 7 may contain map data corresponding to Japanese and English but may not contain map data corresponding to other languages.

When the specified language spoken by the user is neither Japanese nor English, a negative determination is made at act 503. Thereafter, the map-reading control unit 32 sends to the disc-reading device 8 a request for reading map data independent of the user's language. The disc-reading device 8 reads map data read from the DVD 7 in accordance with the request (act 504) and stores the read map data in the map buffer 30 (act 505). The map data does not include data such as the character layer data contained in the drawing unit.

The communication-processing unit 70 sends, to the information center 18 map data dependent on the language spoken by the user via the mobile phone 14 (act 506). Thereafter, the communication-processing unit 70 monitors whether the map data corresponding to the transmission request is received (act 507). When the map data is received, the map data is read in the order of receiving (act 508) and is stored in the map buffer 30 (act 509).

When the user's language specified in processing in act 502 is Japanese or English, since all map data required for these languages is stored on the DVD 7, an affirmative determination is made. Accordingly, the normal map data is read (act 510) and is stored in the map buffer 30 (act 511).

Thus, in the navigation system of this embodiment, map data of less-frequently-used languages is stored in the multilingual DB 19 of the information center 18. When this map data is required, a transmission request is sent, so that the necessary map data can be obtained through communication. As a result, since the navigation system only needs to be provided with the information required for determining the user's language, the amount of storage data corresponding to each language can be reduced. Since the storage amount of the DVD 7 can be reduced, cost cutting can be achieved. In addition, since the amount of data that can be stored is restricted, the number of identifiable potential user languages can be increased by decreasing the amount of data for each of the languages that must be constantly stored.

While the invention has been described in conjunction with several embodiments and working examples, a variety of other modifications and variations are possible without departing from the spirit and scope of the invention as defined by the following claims. The invention is not intended to exclude such modifications and variations.

What is claimed is:

1. A navigation system comprising:
   speech-recognition means for performing speech-recognition processing on input speech spoken by a speaker;

language-determining means for determining a language in which said input speech is spoken based on the contents of said input speech as recognized by said speech-recognition means;

navigation-processing means for performing a vehicle-installed-type navigation operation utilizing the language-as determined by said language-determining means;

image recognition means for determining the contents of the characters included in an inputted image of a road sign; and an intersection guiding means for storing intersection records, generating an intersection guiding image corresponding to the specified language, and generating guiding speech data corresponding to the specified language;

wherein each intersection record includes a plurality of intersection name strings in different languages; and wherein said navigation-processing means includes a guiding means for replacing the characters, whose contents are determined by said image recognition means, with other characters having substantially the same meaning in the language determined by said language-determining means, and for displaying characters or outputting speech.

2. The navigation system according to claim 1, wherein:
said navigation-processing means includes map displaying means for displaying map information showing a vicinity of a vehicle; and
said map displaying means utilizes the language of a speaker, as determined by said language-determining means, for the language of characters included in said displayed map information.

3. The navigation system according to claim 1, wherein:
said navigation-processing means includes route-searching means for searching for a route to a destination and route-guiding means for guiding a vehicle by means of guiding speech along a route set by said route-searching means; and
said route-guiding means generates said guiding speech utilizing the language of a speaker as corresponding to said language determined by said language-determining means.

4. The navigation system according to claim 1, wherein said language-determining means identifies a language of every word in said input speech and determines if a majority of words are spoken in one language.

5. The navigation system according to claim 4, wherein:
said language-determining means includes a database for storing features of a speaker's language as extracted by the language-determining means; and
the speaker's language is determined individually.

6. The navigation system according to claim 1, further comprising:
transmission requesting means for requesting transmission of detailed information in the language of a speaker as determined by said language-determining means; and
information receiving means for receiving the transmitted detailed information transmitted in accordance with the request from said transmission requesting means.

7. A navigation system comprising:
a microphone;
a speech-recognition device operable to determine a language of a spoken word, connected with the microphone;

an identity learning unit operable to compute a frequency of languages determined by said speech-recognition device and update contents of an identity database based on a frequency distribution of the languages stored in said identity database;
a disc reading device operable to read map data from a storage medium;
a map reading control unit operable to specify a speaker's language based on the determination result of said identity learning unit, and send said disc-reading device a request for map data corresponding to the specified language of a speaker;
an intersection guiding unit operable to store intersection records, generate an intersection guiding image, and generate guiding speech data corresponding to the specified language;
a camera;
an image recognition unit operable to determine a language of a character string included in a road sign captured by said camera;
a navigation processing unit operable to replace the character string captured by the image recognition unit with characters in the speaker's language that have the same meaning; and
a display device operable to display a map image showing a vicinity of a vehicle;
wherein each intersection record includes a plurality of intersection name strings in different languages.

8. A navigation system comprising:
a microphone;
a speech-recognition device operable to determine a language of a spoken word, connected with the microphone;
an identity learning unit operable to compute a frequency of languages determined by said speech-recognition device and update contents of an identity database based on a frequency distribution of the languages stored in said identity database;
an intersection guiding unit operable to specify a speaker's language based on the determination result of said identity learning unit, generate an intersection guiding image corresponding to the specified language, and cause a speech data generating unit to generate guiding speech data corresponding to the specified language;
an audio unit operable to output the guiding speech data generated by said speech data generating unit;
a camera;
an image recognition unit operable to determine a language of a character string included in a road sign captured by said camera;
a navigation processing unit operable to translate the character string captured by the image recognition unit into the speaker's language; and
a display device operable to display the intersection guiding image generated by said intersection guiding unit.

9. A navigation system comprising:
a microphone;
a speech-recognition device operable to determine a language of a spoken word, connected with the microphone;
an identity learning unit operable to compute a frequency of languages determined by said speech-recognition device and update contents of an identity database based on a frequency distribution of the languages stored in said identity database;
a camera;

an image recognition unit operable to determine a language of a character string included in a road sign captured by said camera;

a guiding sign generating unit, operable to generate a guiding image in a speaker's language, connected with said image recognition device;

an intersection guiding unit operable to store intersection records, generate an intersection guiding image in the speaker's language, and generate guiding speech data in the speaker's language; and a display device for displaying said guiding image generated by said guiding sign generating unit wherein the guiding unit replaces the character string captured by the image recognition unit with characters in a user's language that have the same meaning.

10. The navigation system according to claim 9, further comprising:

a speech data generating unit connected with said guiding sign generating unit; and an audio unit for outputting guiding speech data generated by said speech data generating unit.

11. The navigation system according to claim 9, wherein said guiding sign generating unit generates a guiding image by replacing character strings in a road sign with character strings of a different language.

12. A navigation system according to claim 9, wherein said guiding sign generating unit generates the guiding image without replacing the language of the character strings contained in said road sign.

13. A navigation system comprising:

a microphone;

a speech-recognition device operable to determine a language of a spoken word, connected with the microphone;

an identity learning unit operable to compute a frequency of languages determined by said speech-recognition device and update contents of an identity database based on a frequency distribution of the languages stored in said identity database;

a disc-reading device operable to read map data from a storage medium;

a map reading control unit operable to specify a speaker's language based on the determination result of the identity learning unit, determine whether map data corresponding to the specified language is not stored in the storage medium, and send said disc reading device a request for reading map data independent of the specified language;

a map buffer operable to store the read map data;

a camera;

an image recognition unit operable to determine a language of a character string included in a road sign captured by said camera;

a navigation processing unit operable to replace the character string captured by the image recognition unit with characters in the speaker's language that have the same meaning; and an intersection guiding unit operable to store intersection records, generate an intersection guiding image, and generate guiding speech data in the speaker's language;

wherein each intersection record includes a plurality of intersection name strings in different languages.

14. The navigation system according to claim 13, further comprising an information processing unit for sending to an information center a request for transmitting the map data dependent on the language of a speaker, for receiving the map data, and for storing the map data in the map buffer.

* * * * *